Sept. 21, 1971      K. V. BLANCHARD      3,606,838

LOAD-SUPPORTING APPARATUS

Filed April 23, 1968

United States Patent Office 3,606,838
Patented Sept. 21, 1971

3,606,838
LOAD-SUPPORTING APPARATUS
Kenneth Vincent Blanchard, Southampton, England, assignor to Hovercraft Development Limited, London, England
Filed Apr. 23, 1968, Ser. No. 723,425
Int. Cl. B60v 1/16
U.S. Cl. 104—23FS                     7 Claims

ABSTRACT OF THE DISCLOSURE

A load supporting apparatus, providing a suspension for example for a tracked air cushion vehicle, consists of a rigid cushion member with wall portions inwardly inclined from a base. The base is supported from a co-operating surface on a cushion of gas which is contained by jets of gas from nozzles in the base. A membrane is connected to the inwardly inclined walls of the cushion member and also to parallel inwardly inclined walls in a load member. The inwardly inclined walls of the load member form a concavity into which the cushion member can withdraw. The load member, cushion member and membrane partially define a chamber for pressurized gas, and the membrane presents a concave surface towards the chamber.

---

Unevenness in the track is accommodated by movement of the cushion member into and away from the load member, which results in the membrane respectively engaging more or less of the inclined walls and hence providing a greater or lesser effective area against which the pressurized gas in the chamber acts.

By increasing the included angle of the inclined walls of the cushion member the suspension becomes softer.

This invention relates to load-supporting apparatus in which a load is at least partly supported by a cushion of pressurized gas formed and contained between the apparatus and a supporting surface.

It is an object of the invention to provide load-supporting apparatus which at least partly absorbs and resists relative movements between the surface and the apparatus and therefore acts as a suspension.

The present invention provides load-supporting apparatus including a cushion member and a load member, said cushion member having a base portion which in use is spaced from a co-operating surface by a cushion of pressurised gas, said cushion member having a wall portion sloping away from and inwardly of the base portion in the direction away from the co-operating surface, said load member having a wall portion defining a concavity into which the wall portion of the cushion member can withdraw, a flexible membrane extending between said wall portions of the cushion member and the load member thereby to movably connect the cushion member with the load member and partially to define, with the cushion member and the load member, a chamber, gas inlet means through which gas under pressure can be supplied to the chamber whereby the cushion member is urged away from the load member, and gas outlet means through which gas can escape to at least assist in forming a load-supporting cushion of pressurised gas between the base portion of the cushion member and the co-operating surface, the wall portions of the cushion member and load member and the arrangement of the membrane therebetween being such that movement of the cushion member into or towards the load member, during use of the apparatus, causes the flexible membrane progressively to engage the wall portion of the cushion member thereby to resist said movement by increase of the effective area on which gas in the chamber acts to urge the cushion member away from the load member.

The concavity may simply be a hole in the load member, but is preferably formed by the wall portion of the wall member being inwardly inclined and, also preferably, generally parallel to the wall portion of the cushion member.

In order that the invention may be more fully understood, embodiments thereof will now be described, by way of example, with reference to the accompanying drawing of which:

Figure 1:
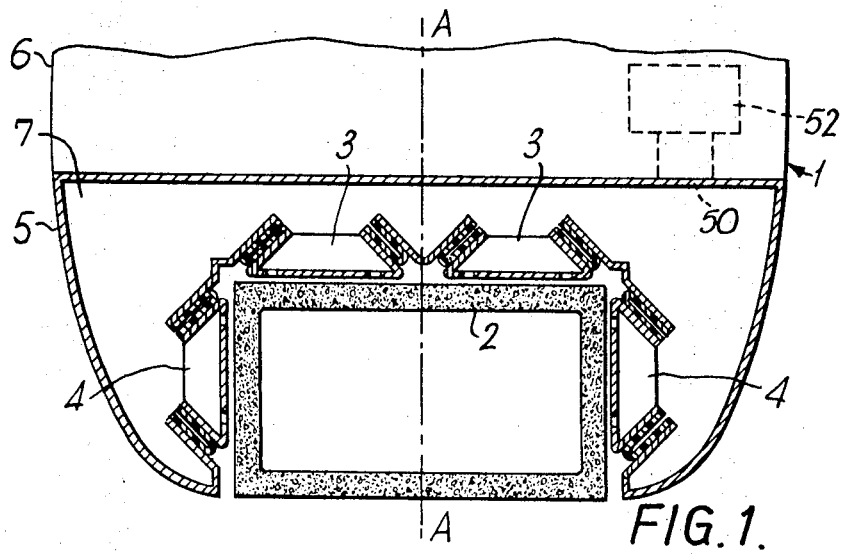
FIG. 1 is an end view, partly in section, of a first form of gas cushion vehicle in accordance with the invention.
Figure 2:
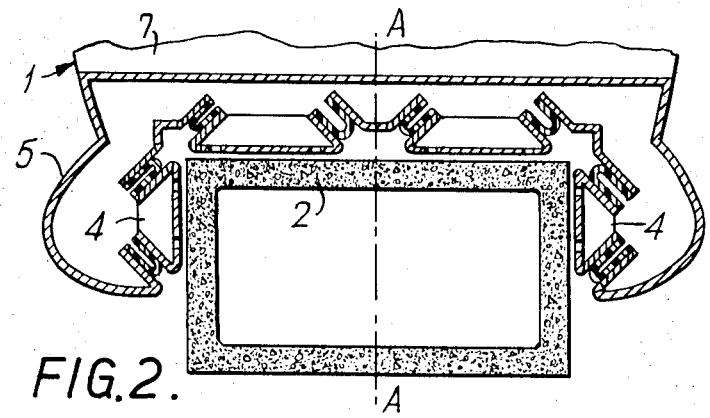
FIG. 2 is a fragmentary end view, partly in section, of a second form of gas cushion vehicle in accordance with the present invention.

In FIGS. 1 and 2, a track-mounted gas-cushion vehicle 1 is arranged for travel along a prepared track 2 of hollow rectangular form over which it is supported by load-supporting units, such as the units 3, two of which are adjacent one end of the vehicle 1, one on each side of the vehicle centre line A—A, and two more of which are adjacent the other end of the vehicle 1 also disposed one on each side of the vehicle centre line A—A.

In operation, the vehicle 1 is supported, at least in part, on cushions of air formed between the units 3 and the upper surface of the track 2, and is propelled by linear motor means as described in Pat. No. 3,263,643. In addition the vehicle 1 carries guide units, such as the units 4, which are symmetrically disposed about the centre lines A—A (adjacent the units 3) for co-operation with the vertical walls of the track 2 to guide the vehicle at least in part.

As may be seen from a comparison of FIGS. 1 and 2, the guide units 4 may extend over the whole height of the track 2, as shown in the embodiment of FIG. 1, or may extend only over a part of this height as shown in the embodiment of FIG. 2, where the units extend over only the upper half of the track.

Figure 3:
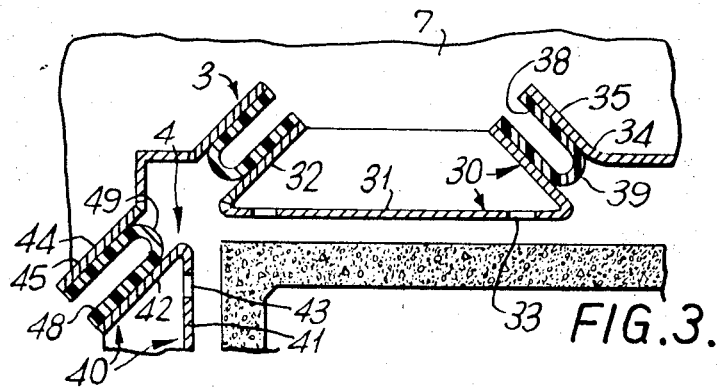
FIG. 3 is a detail of FIGS. 1 and 2 showing the cushion member in section.

FIG. 3 shows, on an enlarged scale, one of the load-supporting units 3 of FIGS. 1 and 2 and the upper part of a guide unit 4. The guide units 4 are similar in construction to the units 3 and, as far as their formation of gas cushions are concerned, they are identical in operation to the units 3 although of course they play a different part in the operation of the vehicle being responsible for holding the vehicle in spaced relationship about the vertical walls of the track 2 whereas the units 3 support, or help to support, the vehicle over the track. As illustrated by the alternative arrangements of FIGS. 1 and 2, the units 4 may be of a same, smaller or greater diameter in comparison with the diameter of the units 3.

Each unit 3 (and 4), see FIG. 3, has a rigid cushion member 30 (40) including a base portion 31 (41) and a wall portion 32 (42) sloping away from and inwardly of the base portion 31 (41). The walls forming the wall portion 32 (42) have their widest separation adjacent the base 31 (41) and then extending inwardly towards the outer edge of the base to define therewith peripheral ports 33 (43) serving as gas outlet means.

Each member 30 (40) is arranged for co-operation with wall portions of an apertured load member 34 (44) which is formed integrally with a part 5 of the vehicle body 6 defining a common chamber 7. The walls forming the wall portion 35 (45) converge inwardly and are generally parallel to the walls 32 (42) of the cushion member 30 (40). Adjacent faces of the members 30 (40) and 34 (44) are joined at their narrowest portions with opposite borders of the same face of a flexible membrane 38 (48) singly folded at fold 39 (49) and presenting a generally concave surface to the chamber 7. The cushion member 30 (40) is connected to the load member 34 (44) solely by the membrane 38 (48) which extends around the periphery of the cushion member.

In operation, pressurised gas, for example air under pressure, is supplied by a fan unit 52 through an inlet 50 to the chamber 7 and passes through the open ends of the members 30 (40), 34 (44) to issue from the ports 33 (43) as a gas curtain which initially forms, and thereafter contains, a cushion of air between the base 31 (41) and the upper (and side) surfaces of the track 2 thereby to support (in the case of members 30) and guide (in the case of members 40) the vehicle during its travel.

It is found in practice that the track 2 is never exactly level and in accordance with the invention relative approaching movement between the vehicle and the track, produced for example as a result of bumps in the track, is absorbed and resisted by the membrane 38 which, in the units 3, increasingly engages with the wall 32 of the member 30 as the members 30 and 34 are brought closer together by an upwards movement of the member 30 relative to the member 34 whereby the effective area of the member 30 subject to the pressure of the gas in the chamber, as delimited by the membrane fold 39, is correspondingly increased to provide an increasing resistance to upwards movement of the cushion member 30.

If the vehicle reaches a depression in the track 2, the cushion member 30 will move downwardly with the result that a lesser amount of the flexible membrane 38 engages the adjacent surfaces of the wall 32 whereby the effective area of the member 30, as delimited by the membrane fold 39, is correspondingly decreased to provide a lesser resistance to upward movement of the cusion member 30.

Thus the units 3, besides providing cushions of air to support the vehicle, also act as suspensions in that vertical undulation in the track 2 are substantially accommodated by the units 3, and any consequent vertical movement of the body of the vehicle is small compared to the movement of the track.

The angle of slope of the walls 32 and 35 (42 and 45) is chosen to provide the desired suspension characteristics. Normally the angle of inclination would be about 45°, and by increasing the included angle the suspension becomes softer.

The units 4 act in a similar manner to the units 3 except that, as already mentioned, they do not support the vehicle but merely guide it by co-operation with the adjacent vertical faces of the track from which they are held spaced by the air cushions they produce. Thus lateral forces exerted on the vehicle, for example by side winds acting on the vehicle, or as a result of alteral distortions of the track or of the track being curved to follow a bend, are similarly absorbed and resisted by the varying amount of the membrane 48 which, in the unit 4, engages with the adjacent faces of the members 40, 44 as their spacing apart is changed as a result of the sideways movement of the member 40 relative to the member 44, thereby to provide an appropriately changing sideways resistance of the cushion member 40.

It will be appreciated that apart from the advantages above described, the apparatus of the present invention provides the membranes 38 with protection from flying objects such as stones during the vehicle's travel along the track by virtue of the concave nature of the member 34 which allows the membrane to be located wholly above the lower surface of the vehicle. Additionally, as the members 30, 34 have their narrowest portions uppermost, any stone for example which does become lodged between the membrane and one of the adjacent member surfaces, is able to fall back on to the track as soon as it is uncovered by a subsequent movement between the members 30 and 34.

Another advantage is that if, in spite of the protection above discussed, the membrane is punctured for some reason or alternatively, if there is unexpected loss of pressure in the cushion gas, then, as above discussed, the member 30 is able to retract out of harm's way into the member 34 as the vehicle is let down on the track, thus considerably reducing the possibility of the cushion member being torn off and jammed beneath the vehicle. If desired, spring biasing means may be provided to assist retraction of the member 30 in the circumstances above discussed. A set of skids is also preferably provided beneath the vehicle to allow it to effect an emergency stop when let down on to the track in this way.

It will be appreciated that the load-supporting apparatus of the present invention is not restricted to the vehicle supporting arrangements of FIGS. 1 to 3. Thus, for example, the arrangements illustrated in FIGS. 1 to 3 can, in effect, be inverted for the support of a conveyor belt (which would take the place of the track 2), the resisting nature of the cushion units being effective to accept varying loads on the conveyor belt.

I claim:

1. Load bearing apparatus including a cushion member and a load member, said cushion member having a base portion which in use is spaced from a co-operating bearing surface by a cushion of pressurised gas, said cushion member having a wall portion sloping away from and inwardly of the base portion in the direction away from the co-operating bearing surface, said load member having a wall portion with an opening towards which the wall portion of the cushion member can move, a flexible membrane extending between said wall portions of the cushion member and the load member thereby to movably connect the cushion member with the load member and partially to define, with the cushion member and the load member, a chamber, gas inlet means through which gas under pressure can be supplied to the chamber whereby the cushion member is urged away from the load member, and gas outlet means through which gas can escape to at least assist in forming a load-bearing cushion of pressurized gas between the base portion of the cushion member and the co-operating bearing surface, the wall portions of the cushion member and load member and the arrangement of the membrane therebetween being such that movement of the cushion member towards the load member, during use of the apparatus, causes the flexible membrane progressively to engage the wall portion of the cushion member thereby to resist said movement by increase of the effective area on which gas in the chamber acts to urge the cushion member away from the load member.

2. Load bearing apparatus for spacing a structure from a bearing surface comprising a cushion member, gas supply means for supplying pressurised gas between the cushion member and a co-operating bearing surface to space the cushion member from the bearing surface by a cushion of pressurized gas, a flexible diaphragm connecting the structure and the cushion member so as to define in part therewith a chamber for pressurized gas, means for supplying pressurised gas to said chamber to space the cushion member from the structure with the flexible diaphragm extending therebetween, the diaphragm having a fold at which it is connected to the cushion member and which is concave to said chamber, the cushion member being movable towards and away from said structure and said bearing surface, the cushion member having a surface which is progressively engageable by the outer surface of said fold, progressive movement of the cushion member away from the bearing surface and towards said structure in use causing the outer surface of said fold progressively to contact said surface of the cushion member outwardly of said chamber at an increasing area of contact so as to provide progressively increasing resistance to said movement.

3. Load bearing apparatus for spacing a structure from a bearing surface comprising a cushion member, a flexible diaphragm connecting the structure and the cushion member and having a fold at which it is connected to the cushion member so as to define in part therewith a chamber for pressurised gas, the diaphragm extending around the chamber with the fold concave thereto, gas inlet means for supplying pressurised gas to said chamber whereby to space the cushion member from the structure with the diaphragm extending therebetween, and gas outlet means formed in the cushion member for supplying pressurised gas from the chamber to the space between the cushion member and a co-operating bearing surface, and for forming in said space a cushion of pressurised gas spacing the cushion member from the bearing surface, the cushion member being movable towards and away from said structure and said bearing surface, the cushion member having a surface which is progressively engageable by the outer surface of said fold, progressive movement of the cushion member away from the bearing surface and towards said structure in use causing the outer surface of the fold progressively to contact said surface of the cushion member outwardly of said chamber at an increasing area of contact so as to provide progressively increasing resistance to said movement.

4. Load bearing apparatus according to claim 3, wherein the gas outlet means comprises gas outlet ports formed in the cushion member and positioned to form a gas curtain operative both to form and contain the cushion of pressurised gas spacing the cushion member from the bearing surface.

5. Load bearing apparatus for spacing a structure from a bearing surface comprising a cushion member having a first portion and a wall portion connected around the periphery of the first portion and sloping away from and inwardly of the first portion, an annular diaphragm formed of a single fold of flexible material connected along one edge to said wall portion, a load member connected to the diaphragm along the other edge thereof, the cushion member, the diaphragm and the load member in combination defining in part a chamber for pressurised gas to which the fold is concave, gas inlet means for supplying pressurised gas to said chamber for spacing the cushion member from the load member, gas outlet means formed in the cushion member for supplying pressurised gas from the chamber to the space between the cushion member and a co-operating bearing surface, and for forming in said space a cushion of pressurised gas spacing the cushion member from the bearing surface, the cushion member being movable towards and away from said load member and said bearing surface, the wall portions of the cushion member and the load member having opposed surfaces each of which is progressively engageable by the outer surface of the diaphragm, progressive movement of the cushion member away from the bearing surface and towards the load member in use causing the outer surface of the diaphragm progressively to contact each of said opposed surfaces outwardly of the chamber at an increasing area of contact so as to provide progressively increasing resistance to said movement.

6. Load bearing apparatus according to claim 5 wherein the opposed surfaces are parallel to one another.

7. Load bearing apparatus for spacing a structure from a bearing surface comprising a cushion member, gas supply means for supplying pressurised gas between the cushion member and a co-operating bearing surface to space the cushion member from the bearing surface by a cushion of pressurised gas, a flexible diaphragm extending between the structure and the cushion member so as to define at least in part a chamber for pressurised gas, means for supplying pressurised gas to said chamber to space the cushion member from the structure with the flexible diaphragm extending therebetween, the diaphragm having a fold at which it is connected to the cushion member, the cushion member being movable towards and away from said structure and said bearing surface, the cushion member having a surface which is progressively engageable by the outer surface of said fold, progressive movement of the cushion member away from the bearing surface and towards said structure in use causing the outer surface of said fold progressively to contact said surface of the cushion member at an increasing area of contact so as to provide progressively increasing resistance to said movement.

References Cited
UNITED STATES PATENTS

| | | | |
|---|---|---|---|
| 3,090,327 | 5/1963 | Crowley | 104—155 |
| 3,246,711 | 4/1966 | Snoeyenbos | 180—115 |
| 3,261,418 | 7/1966 | Bertin | 180—116 |
| 3,330,221 | 7/1967 | Trillo | 104—120 |
| 3,332,361 | 7/1967 | Bertin et al. | 104—120 |
| 3,395,773 | 8/1968 | Duthion et al. | 180—116 |
| 3,414,076 | 12/1968 | Bertin et al. | 180—124 |

ARTHUR L. LA POINT, Primary Examiner

R. A. BERTSCH, Assistant Examiner

U.S. Cl. X.R.

180—7V

PO-1050
(5/69)

UNITED STATES PATENT OFFICE
CERTIFICATE OF CORRECTION

Patent No. 3,606,838      Dated September 21, 1971

Inventor(s) Kenneth Vincent Blanchard

It is certified that error appears in the above-identified patent and that said Letters Patent are hereby corrected as shown below:

Column 1, after line 6, insert --Claims priority, Application Great Britain, April 28, 1967, 19662/67. Column 3, line 23, after "chamber" insert --7--; Line 50, "alteral" should be --lateral--; Line 74, after "is" insert --an--. Column 4, line 2 after "on" insert --to--.

Signed and sealed this 2nd day of May 1972.

(SEAL)
Attest:

EDWARD M. FLETCHER, JR.      ROBERT GOTTSCHALK
Attesting Officer      Commissioner of Patents